United States Patent
Mo et al.

(10) Patent No.: US 11,689,545 B2
(45) Date of Patent: Jun. 27, 2023

(54) PERFORMING CYBERSECURITY OPERATIONS BASED ON IMPACT SCORES OF COMPUTING EVENTS OVER A ROLLING TIME INTERVAL

(71) Applicant: VMware, Inc., Palo Alto, CA (US)

(72) Inventors: Zhen Mo, Sunnyvale, CA (US); Ereli Eran, Watertown, MA (US); Barak Raz, Oakland, CA (US); Vijay Ganti, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 334 days.

(21) Appl. No.: 17/151,142

(22) Filed: Jan. 16, 2021

(65) Prior Publication Data

US 2022/0232032 A1    Jul. 21, 2022

(51) Int. Cl.
*H04L 9/40*    (2022.01)

(52) U.S. Cl.
CPC ...... *H04L 63/1416* (2013.01); *H04L 63/0263* (2013.01); *H04L 63/1441* (2013.01); *H04L 63/20* (2013.01)

(58) Field of Classification Search
CPC ............. H04L 63/0227; H04L 63/0263; H04L 63/1408; H04L 63/1416; H04L 63/1433; H04L 63/1441–1483; H04L 63/20
See application file for complete search history.

(56) References Cited

U.S. PATENT DOCUMENTS

| | | | |
|---|---|---|---|
| 7,032,816 B2* | 4/2006 | Markham | G06Q 50/00 235/375 |
| 8,140,539 B1* | 3/2012 | Cohen | G06F 16/2462 707/748 |
| 8,775,556 B1* | 7/2014 | Matthews | G06F 16/958 709/224 |
| 9,043,302 B1* | 5/2015 | Shimshoni | G06F 16/951 707/706 |

(Continued)

OTHER PUBLICATIONS

Mo, Z., "Highly Compact Virtual Maximum Likelihood Sketches for Counting Big Network Data", IEEE, Fifty-Second Annual Allerton Conference, Oct. 1-3, 2014, 8 pages.

(Continued)

*Primary Examiner* — Eric W Shepperd
(74) *Attorney, Agent, or Firm* — Barta, Jones & Foley, PLLC

(57) ABSTRACT

The disclosure herein describes automatically performing security operations associated with a client system based on aggregated event impact scores of computing events during a rolling time interval. Event data is obtained, wherein the event data is from a plurality of computing devices of the client system associated with computing events occurring during a time interval after an endpoint of the rolling time interval. Event impact scores are calculated for the computing events of the obtained event data over the time interval based at least on cardinality estimation. The calculated event impact scores are merged into the set of aggregated event impact scores associated with the rolling time interval and (Continued)

event impact scores associated with an expired time interval are removed from the set of aggregated event impact scores. Based on the set of aggregated event impact scores, at least one security operation is performed for at least one computing event.

20 Claims, 8 Drawing Sheets

(56) References Cited

U.S. PATENT DOCUMENTS

| | | | | |
|---|---|---|---|---|
| 9,100,205 B1* | 8/2015 | Deshpande | ............ | H04L 41/24 |
| 9,325,733 B1* | 4/2016 | Koi | ............ | H04L 63/1441 |
| 10,803,074 B2* | 10/2020 | Maor | ............ | G06F 21/00 |
| 2007/0005297 A1* | 1/2007 | Beresniewicz | .... | G05B 23/0235 |
| | | | | 702/181 |
| 2008/0120272 A1* | 5/2008 | Sinclair | ............ | G06F 16/2477 |
| | | | | 707/E17.14 |
| 2015/0039749 A1* | 2/2015 | Kwan | ............ | H04L 43/067 |
| | | | | 709/224 |
| 2015/0295779 A1* | 10/2015 | Ching | ............ | H04L 43/022 |
| | | | | 715/733 |
| 2015/0295780 A1* | 10/2015 | Hsiao | ............ | H04L 43/022 |
| | | | | 715/736 |
| 2015/0341212 A1* | 11/2015 | Hsiao | ............ | H04L 67/75 |
| | | | | 715/735 |
| 2017/0063599 A1* | 3/2017 | Wu | ............ | H04L 43/091 |
| 2018/0219875 A1* | 8/2018 | Bania | ............ | H04L 63/1425 |
| 2018/0224831 A1* | 8/2018 | Liu | ............ | G05B 23/0232 |
| 2018/0227322 A1* | 8/2018 | Luo | ............ | H04L 63/1425 |
| 2019/0303385 A1* | 10/2019 | Ching | ............ | G06F 16/26 |
| 2020/0201897 A1* | 6/2020 | Palanciuc | ............ | G06F 16/906 |
| 2021/0264332 A1* | 8/2021 | Pingali | ............ | G06N 3/04 |

OTHER PUBLICATIONS

Unknown, "AWS Athena", https://aws.amazon.com/athena, 2020, downloaded Jan. 16, 2021, 11 pages.

Flajolet, P., "Hyperloglog: The analysis of a near-optimal cardinality estimation algorithm", https://engineering.fb.com/data-infrastructure/hyperloglog/, Mar. 2012, 22 pages.

Honarkhah, M., "HyperLogLog in Presto: A signifcantly faster way to handle cardinality estimation", Data Infrastructure Open Source, https://engineering.fb.com/data-infrastructure/hyperloglog/, Dec. 13, 2018, 10 pages.

* cited by examiner

PERFORMING CYBERSECURITY OPERATIONS BASED ON IMPACT SCORES OF COMPUTING EVENTS OVER A ROLLING TIME INTERVAL

BACKGROUND

Modern computing systems make use of security systems, applications, and associated products to prevent the computing systems from being accessed and/or interfered with by malware, viruses, or other security threats. In some examples, the security systems being used are configured to monitor computing events on the computing systems and, in some cases, to block events from occurring, stop associated processes, reject associated requests for access or the like. Such security enforcement may be performed based on rules that are configured to identify events that are likely to be associated with threats, and to block operation of the identified events (e.g., a deny-list security arrangement) and/or rules that are configured to identify events that have permission to access some portion of the computing system and to provide access to that portion (e.g., an allow-list security arrangement). Configuring such rules to maximize prevention of interference in the computing system by threats while ensuring that the security system does not interfere with the general operation of the computing system presents significant challenges. These challenges are further complicated in modern computing systems that include hundreds of separate computing devices and generate millions or even billions of computing events to be evaluated by the security system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Aspects of the disclosure enhance security platforms that perform security operations associated with a client system at least by obtaining, by a processor, event data from a plurality of computing devices of the client system associated with computing events occurring during a time interval after an endpoint of the rolling time interval; calculating, by the processor, event impact scores for the computing events of the obtained event data over the time interval based at least on cardinality estimation; merging, by the processor, the calculated event impact scores into the set of aggregated event impact scores for computing events associated with the rolling time interval; removing, by the processor, event impact scores of computing events associated with an expired time interval from the set of aggregated event impact scores; and performing, by the processor, at least one security operation for at least one computing event based on the set of aggregated event impact scores.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Figure 1:
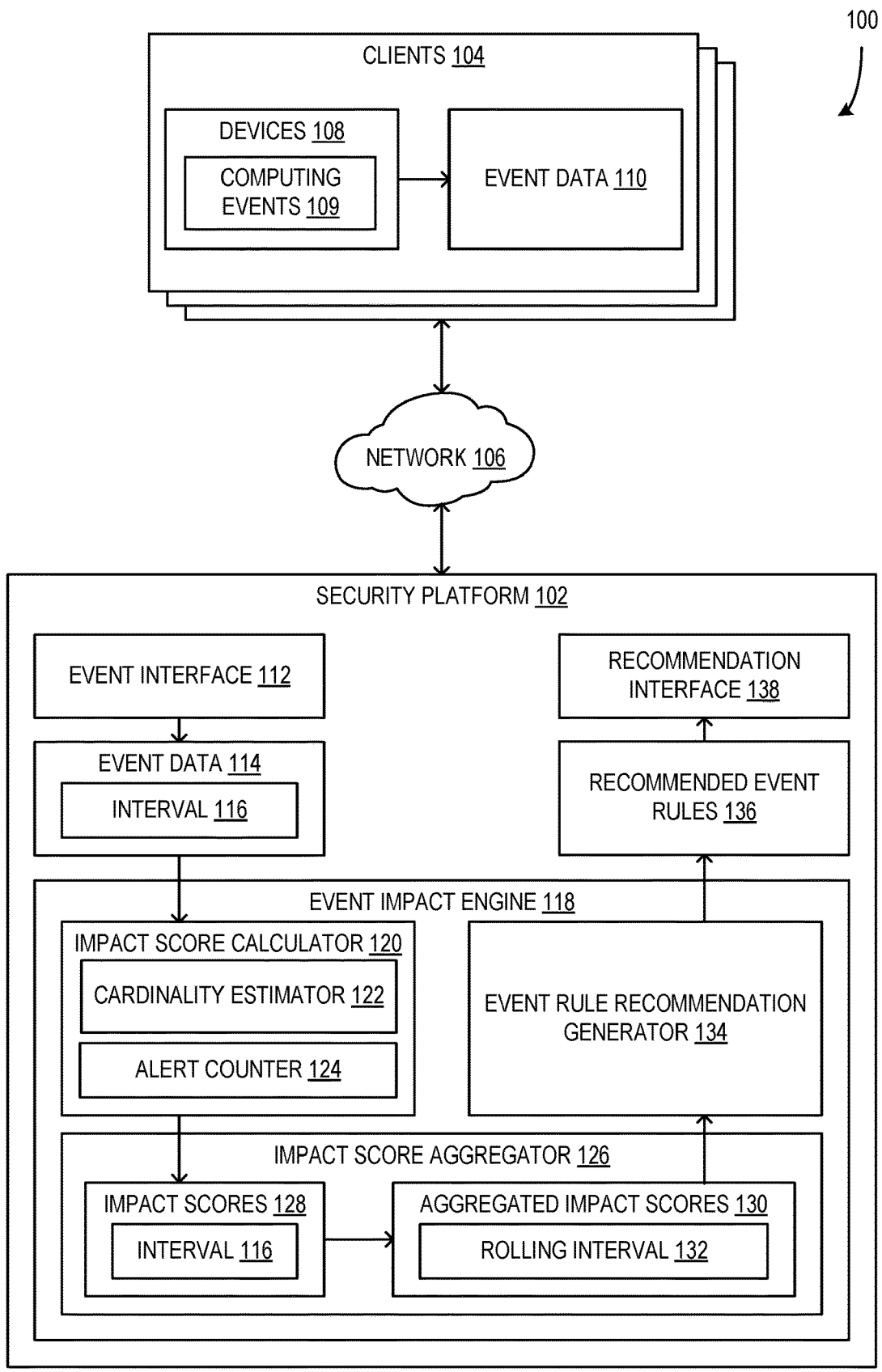
FIG. 1 is a block diagram illustrating a system including a security platform configured to use event data from clients to generate recommended event rules based on an impact of computing events described in event data.

A security system that provides cybersecurity services for client computing systems is described. Such a security system may use deny-list based endpoint security techniques and methods. By deploying user-defined rules to a group of endpoint devices in a client computing system, the security system is configured to restrict operations/behaviors of running process on those endpoint devices to prevent malicious attacks and other threats. In some examples, the security system enables a user of the client computing system to organize devices of the computing system into groups and to attach security policies (e.g., sets of security rules to be enforced) to each group of devices. The described system is configured to streamline the maintenance of those security policies by detecting events that are impactful to a client computing system (e.g., by calculating event impact scores) and, if the detected events are associated with a threat of some kind, automatically performing a security operation, such as recommending a new security rule to the client computing system and/or automatically enabling a new security rule to be enforced within the client computing system. In order to enable such streamlining, the system is configured to efficiently determine the impact of all events on the client system, despite the sheer quantity of events to be processed, by using cardinality estimation techniques to estimate a quantity of unique devices within the client system upon which an event occurs. Those estimates are used to calculate impact scores for events, which are used to trigger or otherwise cause the performance of associated security operations. Additionally, to account for changing impact scores over time, the security system maintains a set of aggregated event impact scores associated with a rolling time interval, such that any security action triggered by the security system is based only on recent event data and associated impact scores.

The described method and system enable the automatic performance of security operations associated with a client system based on aggregated event impact scores of computing events during a rolling time interval. Event data from the computing devices of the client system is obtained. The obtained event data is associated with computing events that occurred on the system during a time interval (e.g., one day). Event impact scores are calculated for the computing events of the obtained event data over the time interval based at least on cardinality estimation. Those event impact scores are then merged with a set of aggregated event impact scores for computing events associated with the rolling time interval (e.g., 30 days, 14 days, or 90 days) and event impact scores of computing events associated with an expired time interval (e.g., the earliest subinterval of the rolling time interval) are removed from the aggregated event impact scores. Based on the updated set of aggregated event impact scores, security operations associated with computing events are then performed by the security system (e.g., recommending to a client system that an event rule be enabled and/or automatically enabling and enforcing an event rule).

The disclosure addresses the challenges, among others, of calculating event impact scores based on counting the quantity of devices within a client (enterprise) system upon which an event occurred and eliminating duplicates from the counted quantity using event data that includes millions or even billions of events. Such an operation requires a significant quantity of memory to perform based on the scale of the dataset. The disclosure describes using a cardinality estimation algorithm, such as HyperLogLog, to determine an estimate of the quantity of devices to within an acceptable level of error, which substantially reduces the memory required to arrive at the estimated values compared to performing a conventional counting operation. To further increase the efficiency of the calculation of event impact scores, the disclosure describes the calculation of event impact scores associated with event data over a short interval, such as one day, and then merging those calculated scores with aggregated event impact scores over a longer interval, such as two weeks, 30 days, or the like. Calculating event impact scores based on a data set of the shorter interval consumes many times less resources than calculating event impact scores based on the longer interval. Using the described merging process enables the disclosure to take advantage of having event impact scores based on a larger data set while minimizing the amount of event data processing required to keep the event impact scores up to date. The disclosure substantially reduces memory usage, as well as other resource usage such as network bandwidth usage, required to process the huge quantities of event data from large, enterprise computing systems, enabling efficient automation of some security operations based on dynamically updated event-specific impact scores.

FIG. 1 is a block diagram illustrating a system 100 including security platform 102 configured to use event data 110 from clients 104 to generate recommended event rules 136 based on the impact of the computing events 109 described in the event data 110. The security platform 102 may obtain or otherwise receive the event data 110 from the clients 104 via a network 106, which may include the Internet, intranets or other private network infrastructure, public network infrastructure, cloud-based network infrastructure, or the like. In some examples, the network 106 includes connections between the clients 104 and the security platform 102 using a plurality of sub-networks (e.g., a client 104 may connect to the security platform 102 via an Internet connection which, in turn, connects to a portal into a private network with which the security platform 102 is associated). Further, connections between the clients 104 and the security platform 102 may include a variety of protocols and/or other communication configurations (e.g., a client 104 may connect to the security platform 102 over the network 106 using a Virtual Private Network (VPN) connection or other type of network protocol).

The security platform 102 includes hardware, firmware, and/or software configured to analyze event data (e.g., event data 110, 114) to determine the impact scores 128 of computing events 109 on devices 108 and/or associated systems of clients 104 and to recommend event rules 136 (e.g., event rules configured to trigger the performance of antivirus operations or other security operations) to the clients based on at least those determined impact scores 128. In some examples, the security platform 102 is located on and executed on a computing device. Alternatively, or additionally, the security platform 102 is distributed among and/or executed on a plurality of computing devices configured to communicate via network connections, such as a cloud computing network.

The security platform 102 includes an event interface 112 that is configured to request, obtain, or otherwise receive event data 110 from clients 104 and provide it as event data 114 to other components of the security platform 102. The event data 110 and 114 includes data that describes computing events 109 that occur on computing devices 108 on clients 104 (e.g., events associated with the operation of application software on the devices 108, events associated with viruses, malware, or otherwise compromised application software on the devices 108, or the like). The event data 114 provided to the security platform 102 via the event interface 112 is associated with an interval 116, which is a time interval during which the events described by the event data 114 occurred on the devices 108. For instance, event data 114 associated with an interval 116 of a specific day includes event data associated with events that occurred on that specific day. In other examples, the interval 116 may be configured as a different length of time (e.g., 6 hours, 12 hours, 3 days, or the like). Alternatively, or additionally, the event data 114 may include a subset of the event data 110 based on other limitations. For instance, the event data 114 may include event data of a defined quantity of events (e.g., data of one million events, two million events, ten million events, etc.). In some examples, the event data includes data fields in Table 1 below.

TABLE 1

| Data Field | Field Description |
| --- | --- |
| behavior_processname | Process path of the event |
| behavior_processhash | Process hash of the event |
| signatureinfo_signedby | Certificate signed by of the event |
| signatureinfo_signingauthority | Certificate Signing Authority of the event |
| deviceid | Device ID where the event occurred |
| environmentname | Name of the environment of the event, e.g., 'prod01', 'prod02' etc. |
| organizationid | Organization ID |
| augmentedbehaviorevent_groupid | Policy ID |
| threatindicators | Threat indicators |
| event_date | timestamp |

The data fields of Table 1 include a process path of the event which can be used to identify the process with which an event is associated and a process hash that may be generated from data of the event in a consistent way, such that the hash can further be used to identify the process and/or the associated event. Additionally, the data fields of Table 1 include a "signed by" value and a "signing authority" value associated with the event which may be used to identify how the process and/or the associated event was verified by certificate within the system. The data fields of Table 1 include a device ID that uniquely identifies the device (e.g., a device 108 of a client 104) upon which the event occurs, an environment name that identifies the software environment in which the event occurs (e.g., an AMAZON WEB SERVICES (AWS) environment name), and an organization ID that identifies the organization with which the event is associated (e.g., an internal unique identifier for each customer). Further, the data fields of Table 1 include a policy ID and threat indicators associated with existing event handling policies that may apply to the event. In some examples, threat indicators may include indicators of a process or application performing the following: trying to communicate over the network, trying to scrape memory of another process, trying to inject code or modify memory of another process, trying to execute code from memory, trying to invoke an untrusted application, trying to invoke a command interpreter, and/or performing ransomware-like behavior. Finally, the data fields of Table 1 include an event date value that is a timestamp of when the event occurred. In other examples, more, fewer, and/or different data fields may be included in the event data 114 without departing from the description herein (e.g., data fields containing data used to identify a certificate by a serial number and/or by a hash value).

The security platform 102 is configured to provide the event data 114 to the event impact engine 118 for use in determining event impact scores as described herein. In some examples, the event impact engine 118 includes hardware, firmware, and/or software configured to receive event data 114, calculate individual event impact scores 128 using an impact score calculator 120, and combine the impact scores 128 into aggregated impact scores 130. The event impact engine 118 may further be configured to use the aggregated impact scores 130 to generate recommended event rules 136 via an event rule recommendation generator 134. Alternatively, or additionally, the event impact engine 118 and/or the security platform 102 more generally may be configured to use the aggregated impact scores 130 to perform other antivirus and/or security operations automatically (e.g., triggering alerts to clients based on detecting events with high aggregated impact scores, automatically enabling and/or enforcing event rules based on detecting events with high aggregated impact scores).

In some examples, the impact score calculator 120 is configured to receive the event data 114 and calculate impact scores 128 for each event in the event data 114 over the interval 116. Calculation of an impact score 128 for an event may include the determination of the cardinality of the event (e.g., the quantity of devices 108 upon which the event occurs one or more times during the interval) and/or a quantity of alerts that occur in association with the event. In some examples, calculation of cardinality of an event includes counting the occurrences of the event over the interval 116 in the event data 114 and eliminating occurrences from the total that are duplicate event occurrences on each device. Said another way, the cardinality may be calculated by counting the first occurrence of the event on a device and ignoring additional occurrences of the event on that device, such that the resulting cardinality value indicates the quantity of unique devices upon which the event occurred during the interval 116. However, in other examples, the quantity of event data 114 makes calculating the exact cardinality of an event impractical or even impossible (e.g., due to memory limitations or other limitations of the event impact engine 118). For instance, the security platform 102 may receive event data from thousands of clients that generate billions or tens of billions of events per day and millions or tens of millions of those events may be unique. In such examples, the impact score calculator 120 is configured to use a cardinality estimator 122 to probabilistically estimate cardinality values of events in the event data 114 and to use those estimated cardinality values in calculation of impact scores 128. For instance, the cardinality estimator 122 may be configured to perform a HyperLogLog algorithm on the event data 114 for each event therein to obtain a cardinality estimate for each event that occurred within the interval 116 at the associated client 104. In other examples, other cardinality estimation algorithms, operations, or methods may be used by the impact score calculator 120 without departing from the description herein. The resulting cardinality estimates may include cardinality values and are associated with an accuracy or error value based on the estimation method used (e.g., cardinality estimates generated using a HyperLogLog algorithm may be associated with an accuracy of 2%, indicating that estimated cardinality is within 2% of the actual cardinality). Further, in other examples, use of the HyperLogLog algorithm or other similar algorithm may be improved using Maximum Likelihood Sketches or other similar techniques without departing from the description.

In some examples, the impact score calculator 120 further counts a quantity of alerts associated with events using an alert counter 124. The alert counter 124 may be configured to count, for each event in the event data 114, each alert that occurred during the interval 116. As a result, the alert counter 124 generates an alert count value for each event in the event data 114. For an event, an impact score 128 may be generated by combining the cardinality value of the event (e.g., indicating how many devices 108 within a client system are affected by the event) and the alert count value of the event (e.g., indicating how many alerts are caused within the client system by the event). Alternatively, in other examples, more, fewer, or different data values may be used to calculate an impact score without departing from the description.

In some examples, the combination of a cardinality value and an alert count value for an event to calculate an impact score 128 of that event includes applying normalization values and/or weight factor values to one or both of the cardinality value and the alert count value and then combining the resulting values by adding them, multiplying them, or otherwise combining them in some other manner. For instance, if cardinality values tend to be substantially different in scale than alert count values (e.g., cardinality values may tend to be in the thousands while alert count values tend to be in the tens of thousands such that alert count values have a substantially larger effect on the result when combined with cardinality values), the values may be normalized and/or scaled such that they may be combined in a more balanced way. As an example, the cardinality value may be normalized or rescaled by dividing it by the total quantity of devices in the associated client system such that the resulting value indicates a percentage of devices that were affected by the associated event during the interval 116 (e.g., a cardinality value of 300 is divided by a total quantity of devices of 1000, resulting in 0.3 or 30% of the devices in the client system being affected by the event). Alternatively, or additionally, the impact score calculator 120 may be configured to apply weight factor values to the cardinality values and/or alert count values to alter the degree to which each type of value affects the resulting impact score. For instance, for an event, the cardinality score may be multiplied by a weight factor value of 0.75 while the alert count score may be multiplied by a weight factor value of 0.25 and then the resulting values are added together to calculate an impact score. As a result of applying the weight factor values to each value, the cardinality value affects the impact score with three times more weight than the alert count score. In other examples, other methods of normalizing or rescaling values and/or other methods of applying weight factors to values may be used without departing from the description herein.

The impact scores 128 associated with the interval 116 of the event data 114 are provided to the impact score aggregator 126. In some examples, the impact score aggregator 126 is configured to combine the received impact scores 128 into a set of aggregated impact scores 130 that are associated with a rolling interval 132 (e.g., additively increasing the interval covered by the aggregated impact scores as described below with respect to FIG. 3). Upon combining the impact scores 128 with the aggregated impact scores 130, the rolling interval 132 is updated to include the interval 116 (e.g., a rolling interval 132 from January $1^{st}$ to January $30^{th}$ is updated to include an interval 116 of January $31^{st}$ when the impact scores 128 associated with the January $31^{st}$ interval are combined with the aggregated impact scores 130 associated with the January $1^{st}$ to January $30^{th}$ rolling interval). Additionally, upon combining the impact scores 128 into the aggregated impact scores 130, the aggregated impact scores 130 and the associated rolling interval 132 may be updated to remove the earliest subset of impact scores from the aggregated impact scores 130 and to remove the interval associated with the earliest subset from the rolling interval 132 (e.g., after updating the aggregated impact scores associated with the rolling interval 132 from January $1^{st}$ to January $30^{th}$ to include impact scores from January $31^{st}$, aggregated impact scores may be updated to remove impact scores associated with January $1^{st}$ and the rolling interval 132 may be updated to remove the January $1^{st}$ interval, such that the resulting aggregated impact scores are associated with an updated rolling interval 132 of January $2^{nd}$ to January $31^{st}$).

In some examples, combining an impact score 128 of an event with an aggregated impact score 130 of the event includes calculating a ratio of the interval 116 to the rolling interval 132 (e.g., interval 116 of one day divided by rolling interval 132 of thirty days), multiplying the impact score 128 by the ratio, and adding the resulting value to the aggregated impact score 130. In this way, the newly included impact score 128 changes the aggregated impact score 130 by a relatively small degree, preserving the effects of other impact scores that have previously been included in the aggregated impact score 130. Similarly, the impact score associated with the earliest subinterval in the rolling interval may be removed in a similar manner by determining the impact score associated with the earliest subinterval, calculating a ratio of the length of the earliest subinterval to the length of the rolling interval 132, multiplying the determined impact score by the calculated ratio, and subtracting the resulting value from the aggregated impact score 130. In other examples, other methods of updating and/or removing impact scores from aggregated impact scores and updating rolling intervals may be used without departing from the description herein.

The event impact engine 118 further includes an event rule recommendation generator 134 that is configured to receive the aggregated impact scores 130 and generate recommended event rules 136 based on those aggregated impact scores 130. In some examples, the event rule recommendation generator 134 is configured to identify events that that have relatively high aggregated impact scores 130 (e.g., events that have aggregated impact scores 130 that exceed a defined score threshold, events that have aggregated impact scores 130 within a top 10% of scores or based on another percentile range of all events analyzed). Those identified events may then be flagged to be subject to generated recommended event rules 136. Additionally, or alternatively, the event rule recommendation generator 134 may be configured to access existing event rule sets (e.g., event rules that have been previously used with the current's system and/or event rules that are being used or have been used with respect to other clients' systems) and matching those exciting event rule sets to the identified events. As a result, if an event rule for enforcing security measures with respect to a particular event already exist and/or are already in use elsewhere, the event rule recommendation generator 134 may be configured to recommend that that existing event rule be enabled or activated with respect to a client based on the event becoming more impactful in the client's system.

In some examples, the recommended event rules 136 include rules that operate as deny-list-based endpoint device security rules (e.g., for devices 108) that are configured to restrict operations and/or behaviors of those endpoint devices based on events in order to prevent malicious attacks. Client systems may be subdivided into different device groups and the client may use the services provided by the security platform 102 to attach event rule-based policies (e.g., "policy rules") to the groups. Such policies include one or more event rules that block and/or grant permission for operations to be performed and/or interactions between devices to be enabled. In some examples, each blocking or permission rule is composed of a three-element tuple including a subject, an operation, and an action. Such a rule is evaluated: if the subject does the operation, the action of the rule will be performed by the security platform 102 or a related entity within the client system (e.g., a rule with a subject of a known malware application, an operation of running or executing, and an action of terminating the process is enforced by detecting when the known malware application is running or executing as a process on the device and, based on that detection, terminating the process upon which the known malware is running). Permission and/or blocking rules may include predefined values as elements (e.g., known malware identifiers) and/or more dynamic process path values that may include wildcard characters (e.g., C:\Program Files\StringFinder.exe and/or C:\Windows\*.exe). Additionally, or alternatively, event rules enforced by the security platform 102, such as recommended event rules 136, may include reputation rules that are defined at a higher level (e.g., at the "org" level rather than specific group level) than the described group-level policy rules. Reputation rules may be enforced based on file hashes (e.g., a sha256 hash of a file), information technology (IT) tools (e.g., file paths of specific IT tools used to manage the configuration of operating systems and install software), and/or certificates associated with files (e.g., a combination of a certification "signed by" and a certification authority). However, in other examples, more, fewer, or different types of event-based security rules may be generated and/or enforced on client systems based on the impact analysis of the security platform 102 without departing from the description.

After generation by the event rule recommendation generator 134, the security platform 102 may be configured to provide the recommended event rules 136 to the client 104 via the recommendation interface 138. The recommendation interface 138 may be configured to send the recommended event rules 136 to the client 104 system via the network 106, enabling the client 104 to view, observe, or otherwise interact with the recommended event rules 136 and either approve or reject the recommendations. Alternatively, or additionally, the recommendation interface 138 may include an interface that clients 104 are enabled to access over the network (e.g., via a browser application or the like) to view or otherwise obtain the recommended event rules 136. In some examples, the recommendation interface 138 further enables clients to approve, reject, or otherwise provide feedback on the recommended event rules 136. If rules are accepted by the client, the security platform 102 or a related entity may be configured to enforce the accepted rules. Alternatively, if rules are rejected, the security platform 102 may refrain from enforcing those rules. The feedback received from the client may be stored and/or used during future event rule recommendation generation (e.g., a previously rejected event rule may be highlighted for the client to indicate that they have previously rejected it).

It should be understood that, in some examples, users associated with client systems are enabled to customize or otherwise adjust settings and configurations of event rules and associated security policies enforced by the security platform 102 without departing from the description. Users at client systems may be enabled to adjust event rules (e.g., change thresholds that are evaluated, adjust file paths that are detected, add to or remove from lists of known malware or known trusted software, etc.). Such configuration activities may be requested or performed by users of client systems in conjunction with the described operations of the security platform 102 without departing from the description.

Figure 2:
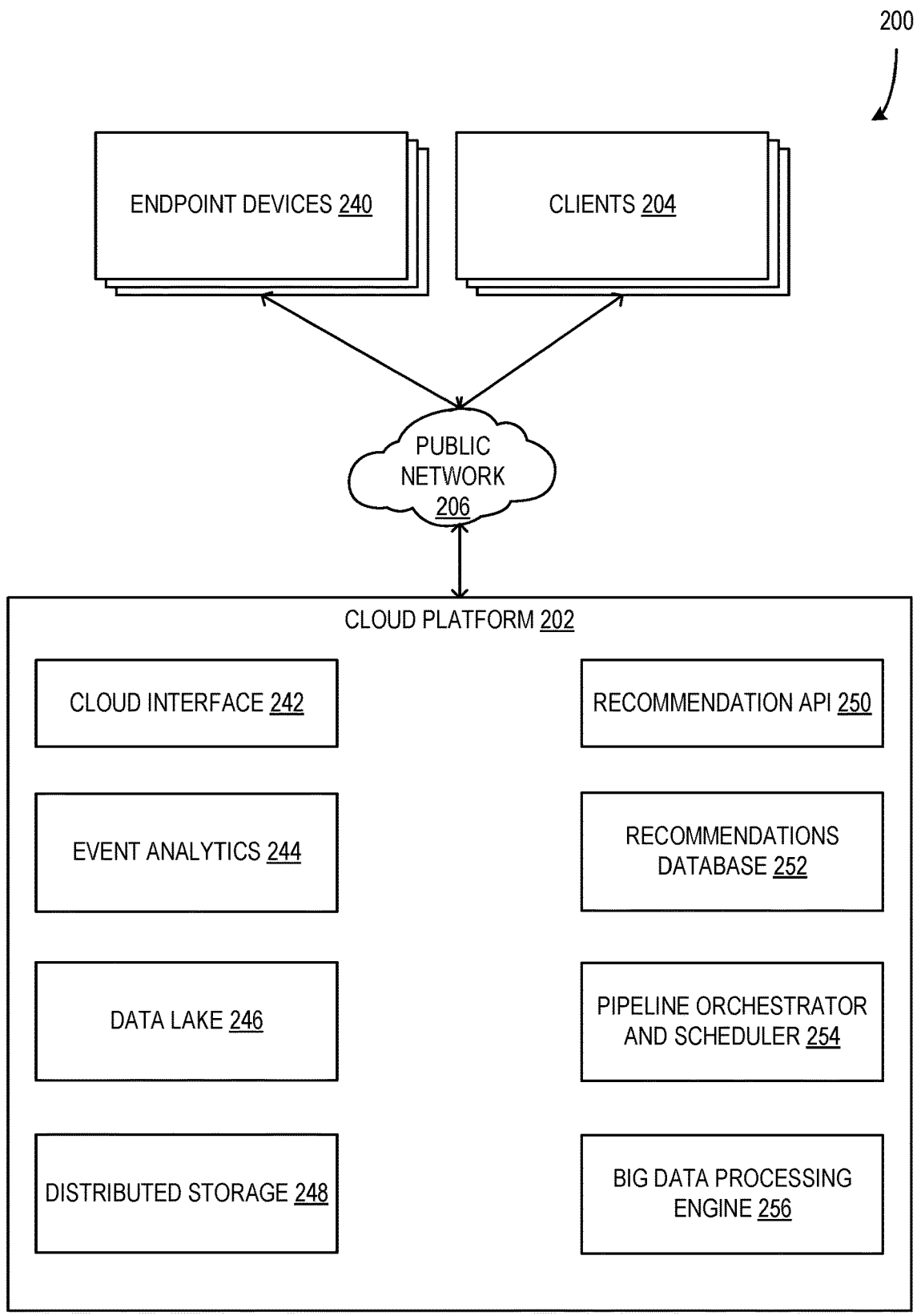
FIG. 2 is a block diagram illustrating a system in which the security platform of FIG. 1 operates according to an embodiment.

FIG. 2 is a block diagram illustrating a system 200 in which the security platform 102 of FIG. 1 operates according to an embodiment. The system 200 includes a cloud platform 202 with which clients 204 and associated endpoint devices 240 communicate via a public network 206 (e.g., the Internet). In some examples, the cloud platform 202 is a plurality of distributed computing devices configured to provide services to the clients 204 and associated endpoint devices 240 and to perform operations as described herein. The cloud platform 202 includes a cloud interface 242 configured to receive communications from clients 204 and/or endpoint devices 240 to the cloud platform 202 and to send communications from the cloud platform 202 to the clients 204 and/or endpoint devices 240 (e.g., the recommended event rules 136 of FIG. 1). The cloud platform 202 further includes an event analytics module 244 that feeds into a data lake 246. In some examples, event analytics 244 includes some or all the security platform 102 (e.g., it may include the event impact engine 118, which analyzes the impact of events within a client's system). Additionally, or alternatively, the event analytics module 244 may perform more, fewer, or different types of analytics on event data from clients without departing from the description. The data lake 246 is a data store that is configured to store data associated with the event analytics 244 and/or the big data processing engine 256 in multiple storage formats or structures. Data stored in the data lake 246 may also be transferred to distributed storage 248 data stores of the cloud platform 202 for long term storage.

The cloud platform 202 further includes a recommendation application programming interface (API) 250 and a recommendations database 252 enabling interaction with and storage of recommendations such as recommended event rules 136. The pipeline orchestrator and scheduler 254 may be configured to manage the generation of recommendations for storage in the recommendation database 252 and associated big data processing by the big data processing engine 256. In some examples, the big data processing engine 256 is configured to perform cardinality estimation (e.g., the cardinality estimator 122 of the impact score calculator 120 may be associated with the big data processing engine 256). The pipeline orchestrator and scheduler 254 may be configured to trigger the analysis performed by the event analytics 244 and/or the big data processing engine 256 based on a defined schedule, including triggering an event impact engine 118 to determine impact scores of events based on event data from a recent time interval as described herein. For instance, the pipeline orchestrator and scheduler 254 may be configured to trigger event analytics 244 once per day to determine impact scores of events based on a day-long interval of event data and generate recommended event rules 136 as described herein. In some examples, the cloud platform 202 is configured to perform more and/or different event analytics operations and/or big data processing operations without departing from the description.

Figure 3:
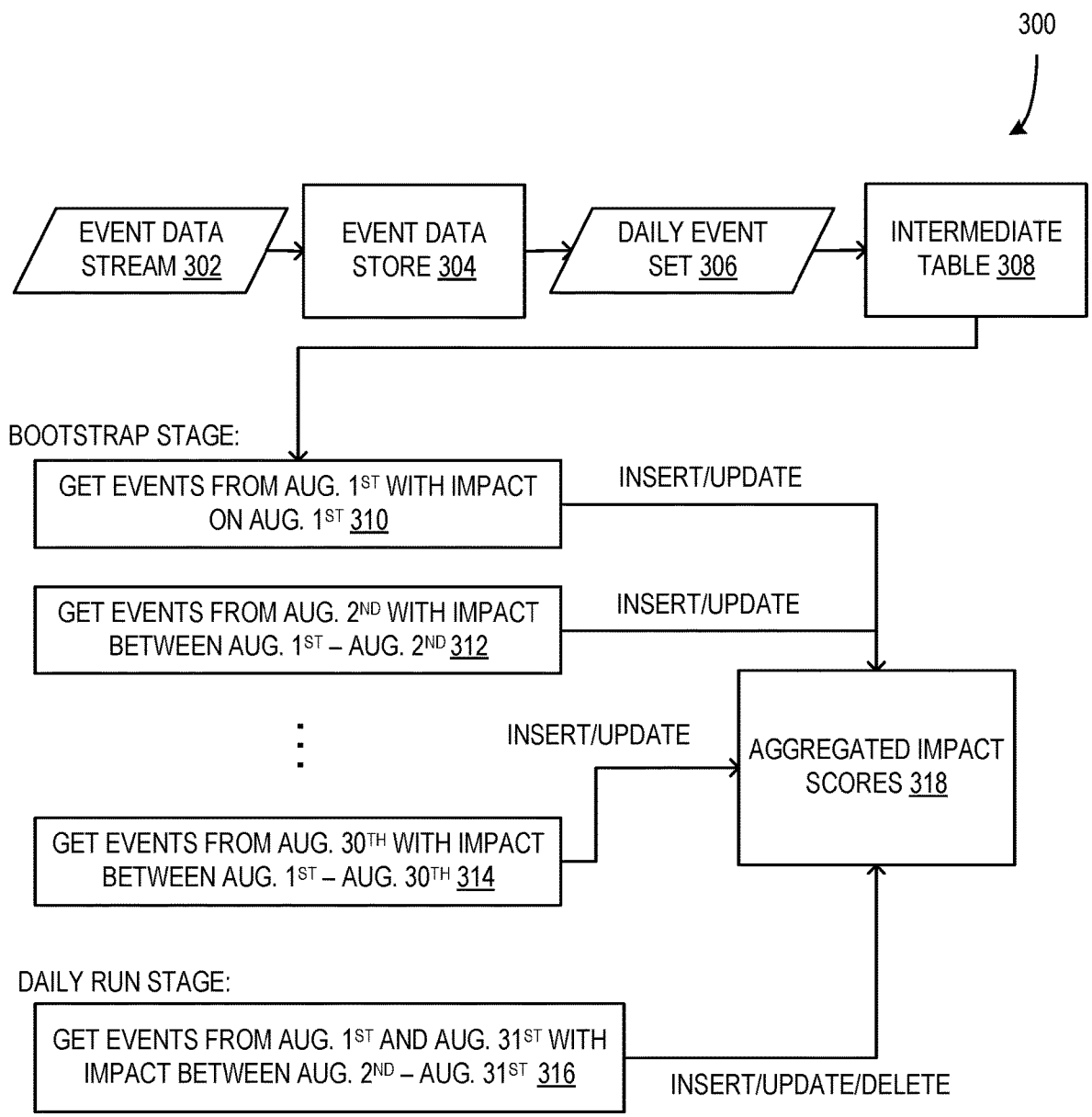
FIG. 3 is a block diagram illustrating a two-stage process of generating and maintaining aggregated impact scores of computing events according to an embodiment.

FIG. 3 is a block diagram 300 illustrating a two-stage process of generating and maintaining aggregated impact scores 318 of computing events (e.g., computing events 109) according to an embodiment. In some examples, the processes described in FIG. 3 are performed by a security platform such as security platform 102 of FIG. 1 and/or components thereof, such as the impact score aggregator 126 of FIG. 1. In the illustrated process, an event data stream 302 streams data into an event data store 304 for storage. The event data stream 302 may be a stream of data from a client (e.g., client 104) over a network connection as described herein. The event data store 304 is configured to store event data as it arrives via the event data stream 302 and it may be in the form of a database, a data lake, or other data structure. A daily event set 306 is obtained from the event data store 304, which stores large quantities of event data over more than one day. The daily event set 306 is stored in an intermediate table 308 that enables the system to perform analysis operations on the single day event set 306. In some examples, the intermediate table 308 is configured to store event data partitioned, grouped, or otherwise sorted based on the datetime of events occurring and based on an environment or other classification in which the events occur, enabling more efficient querying of the event data during the described analysis. Additionally, or alternatively, in some examples, cardinality estimates (e.g., generated by a cardinality estimator 122) are generated based on event data and stored in the intermediate table 308 as well.

The described process includes a two-stage additive increase query process. If a set of aggregated impact scores 318 does not exist or is incomplete (e.g., the aggregated impact scores are based on a shorter set of intervals than the defined length of the rolling interval 132), the bootstrap stage is performed to establish a set of aggregated impact scores 318 that are based on a time interval that is the defined rolling interval length. In the illustrated example, the defined rolling interval length is 30 days, and the subinterval length is one day, which is why event data is obtained from the event data store 304 in one day intervals in the daily event set 306. Alternatively, if the set of aggregated impact scores 318 is based on a time interval that is the defined rolling interval length (e.g., 30 days), the daily run stage is performed once a day.

During the bootstrap stage, daily event sets associated with each of the most recent subintervals that make up a full rolling interval are combined to enable additive generation of aggregated impact scores. In the illustrated example, during the bootstrap stage, each one-day interval of event data of the past 30 days is analyzed in order to generate the aggregated impact score 318. The illustrated example shows the bootstrap stage being performed on event data between August $1^{st}$ and August $30^{th}$ inclusively, which is the 30-day rolling interval length. At 310, event data of events from August Pt that have an impact on August $1^{st}$ is obtained and the event data is used to calculate impact scores of those events. In some examples, obtaining the event data includes querying the intermediate table 308. Those impact scores are inserted and/or updated in the aggregated impact scores 318 as described herein. In some examples, since the impact scores calculated at 310 are the first scores to be added to the aggregated impact scores 318, those scores simply become the current aggregated impact scores 318.

At 312, event data of events from August $2^{nd}$ that have impact between August $1^{st}$ and August $2^{nd}$ is obtained and the event data from August $2^{nd}$ is used to calculate impact scores of those events. Those calculated impact scores are used to insert and/or update the aggregated impact scores 318. If a score for an event already exists in the aggregated impact scores 318, that score is updated based on the impact score calculated from the August $2^{nd}$ event data. Alternatively, if no score for an event exists yet and the calculated impact scores of August $2^{nd}$ include an impact score for that event, the new impact score for the event is inserted into the aggregated impact scores 318 as described herein. In some examples, aggregation of impact scores from daily event sets into aggregated impact scores includes treating a day without an impact score for an event as an impact score of zero. For instance, assume an event has three days of impact scores of 70, 80, and 90 and one day with no impact score. An aggregated impact score may be calculated by adding the impact scores, including a zero for the day with no impact score, and dividing by four: 70+80+90+0=240/4=60 aggregate impact score. In other examples with different methods of aggregating impact scores, days with no impact score may be handled differently without departing from the description.

At 314, event data of events from August $30^{th}$ that have impact between August $1^{st}$ and August $30^{th}$ is obtained and the event data from August $30^{th}$ is used to calculated impact scores of those events. The calculated impact scores are used to insert and/or update the aggregated impact score 318. As this is the $30^{th}$ day of the defined rolling interval for the aggregated impact scores 318, the bootstrap stage is complete. Thus, the set of aggregated impact scores are generated by additively increasing the associated event data used to calculate the aggregated impact scores in multiple steps based on subintervals of the defined rolling interval.

The daily run stage is performed each day as illustrated at 316. Event data from August $1^{st}$ (the earliest subinterval of the rolling interval of the aggregated impact scores 318) and from August $31^{st}$ (the next subinterval to be included in the rolling interval of the aggregated impact scores 318) is obtained and impact scores for events are calculated based on both sets of data. In some examples, obtaining the event data includes querying the intermediate table 308 for event data and/or impact scores associated with events from August $1^{st}$ and events from August $31^{st}$. Alternatively, or additionally, in some examples, the impact scores from August $1^{st}$ event data, which were previously calculated at 310, may be stored or otherwise preserved (e.g., stored with the aggregated impact scores 318 and/or stored in the intermediate table 308) such that those impact scores need not be recalculated at 316. The impact scores calculated based on the August $31^{st}$ event data are inserted and/or updated into the aggregated impact scores 318 as described herein.

The impact scores calculated based on the August $1^{st}$ event data are used to update and/or delete impact scores that have expired or become "stale" from the aggregated impact scores 318. Because the aggregated impact scores 318 are based on a rolling time interval of a defined length (e.g., 30 days), event data and/or associated impact scores expire or become "stale" with respect to that rolling time interval when the rolling time interval moves beyond the date/time with which the event data and/or associated impact scores are associated. In the illustrated case, because the rolling interval is 30 days in length, any impact scores based on data that is older than 30 days is considered expired or "stale" and phased out of the aggregated impact scores 318. This process includes updating aggregated impact scores based on daily impact scores that are phased out and/or removing or deleting aggregated impact scores from the set of aggregated impact scores 318 if phasing out daily impact scores removes the only non-zero impact score from the aggregated impact scores. For instance, for an event with an aggregated impact score 318, if the only daily set of event data that includes data indicating an impact by the event is the August $1^{st}$ set of event data, upon performing the daily run stage process at 316, the aggregated impact score 318 of that event is removed from the set of aggregated impact scores 318, as no remaining daily data set from August $2^{nd}$ to August $31^{st}$ includes event data indicating the event had an impact on the system.

Figure 4:
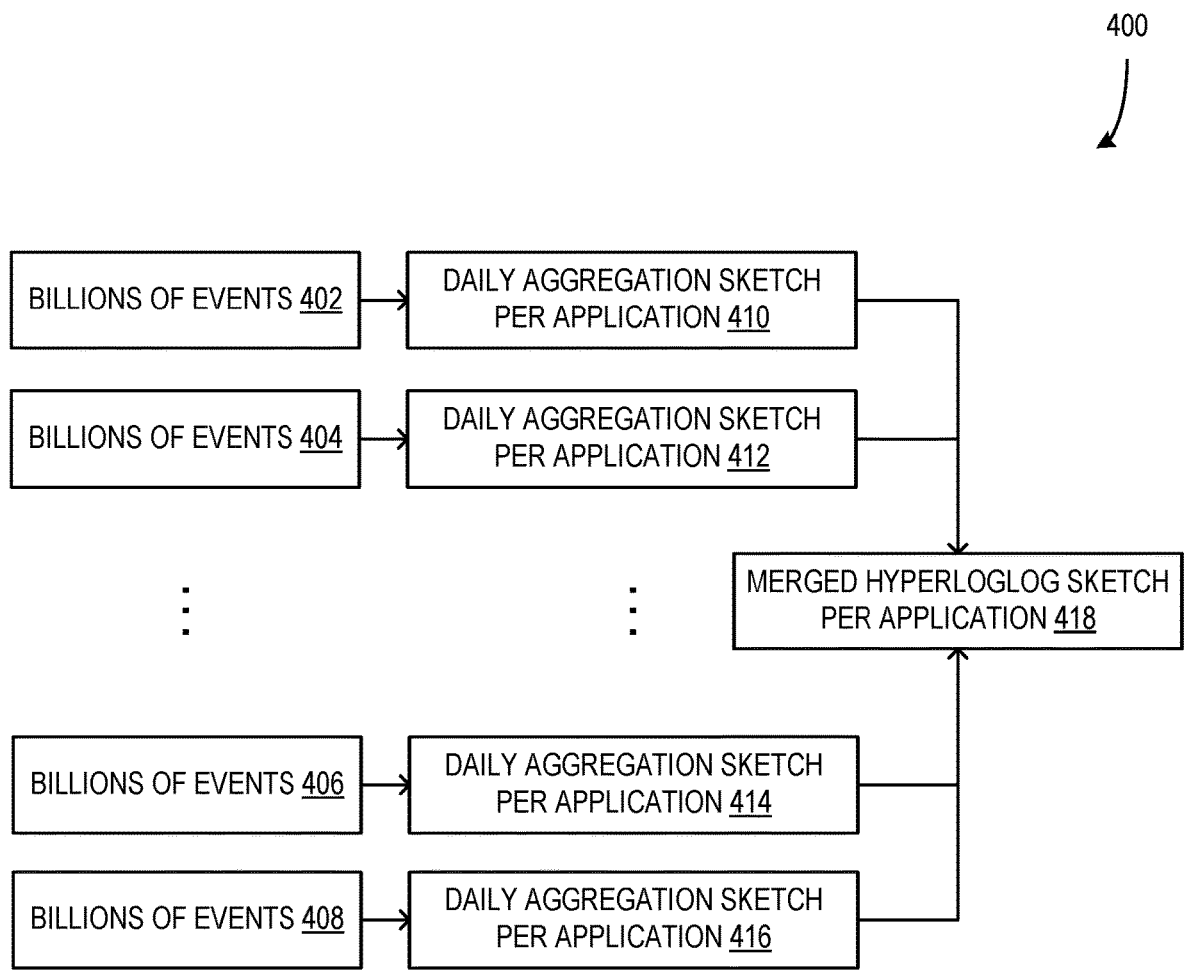
FIG. 4 is a diagram illustrating the generation of daily aggregation sketches and merging of those sketches into a merged HyperLogLog sketch according to an embodiment.

FIG. 4 is a diagram 400 illustrating the generation of daily aggregation sketches 410-416 and merging of those sketches into a merged HyperLogLog sketch 418 according to an embodiment. In some examples, the illustrated process is performed by a security platform 102 of FIG. 1 and/or components thereof, such as an impact score calculator 120 and/or an impact score aggregator 126. "Sketches" are equivalent to estimated cardinality values that may be generated using a HyperLogLog algorithm or other similar algorithm (e.g., estimated cardinality values generated by a cardinality estimator 122 of FIG. 1, as described above). In the illustrated example, as an alternative to calculating daily impact scores and then merging those impact scores into aggregated impact scores (e.g., aggregated impact scores 130), daily sketches per application 410, 412, 414, and 416 are generated based on event data of billions of events 402, 404, 406, and 408 and those daily sketches are merged into merged HyperLogLog sketches per application 418. As shown, billions of events may be used as input to the process each day, with billions of events 402, 404, 406, and 408 each representing a set of billions of events for particular days. The event data associated with those billions of events is analyzed as described herein to generate, for each application or other software entity running on the associated system, a daily aggregation sketch, with daily aggregation sketches per application 410, 412, 414, and 416 each representing a set of daily aggregation sketches for particular days.

The merged HyperLogLog sketch 418 of each application or other software entity is obtained by merging each daily aggregation sketch 410-416 for the associated application. Merging may include averaging the daily aggregation sketch values and/or otherwise combining them such that each daily aggregation sketch affects the resulting merged HyperLogLog sketch 418 (e.g., more recent daily aggregation sketches may be weighted more heavily than less recent daily aggregation sketches in the merged sketch). The merged HyperLogLog sketch 418 may then be used to generate aggregated impact scores (e.g., aggregated impact scores 130), to generate recommended event rules (e.g., recommended event rules 136) directly, and/or to automatically perform an action or process based on the resulting value(s) of the merged HyperLogLog sketches 418 (e.g., if a merged HyperLogLog sketch 418 for an application exceeds a defined threshold, the system may be configured to flag that application as a potential target for event rules and/or to activate event rules associated with the application to be enforced by the system or another related system). Further, in some examples, the merged HyperLogLog sketches 418 may be based on daily aggregation sketches 410-416 over a rolling interval of a defined length (e.g., 30 days) as described herein.

Figure 5:
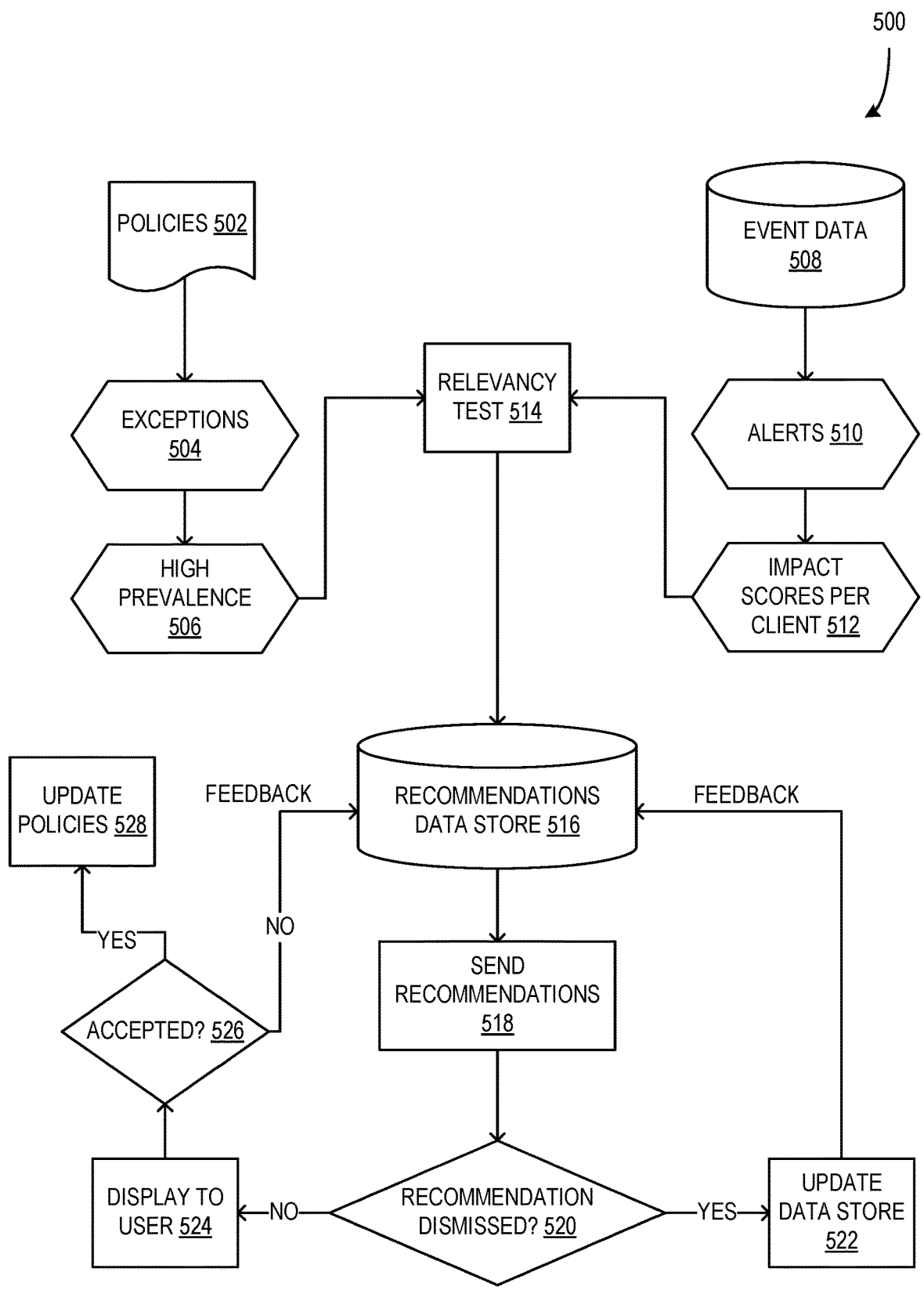
FIG. 5 is a diagram illustrating a policy recommendation process that uses impact scores based on analyzed event data according to an embodiment.

FIG. 5 is a diagram illustrating a policy recommendation process 500 that uses impact scores based on analyzed event data according to an embodiment. In some examples, the process 500 or at least some portion of the process 500 is executed or otherwise performed by a security platform such as security platform 102 of FIG. 1. The process 500 is configured to use existing policies 502 (e.g., sets of event rules that are enforced at one or more clients of the system) and event data 508 associated with events occurring at the one or more clients to make recommendations of policies and/or event rules to clients.

Of the policies 502, event rules associated with an application or other software entity that are based on exceptions 504 and that have high prevalence 506 among client systems are matched with alerts 510 and impact scores per customer and group 512 associated with the application or other software entity and a relevancy test 514 is applied thereto. In some examples, the alerts 510 of the event data 508 are incorporated into the impact scores 512 as described above with respect to the calculation of impact scores 128 by the impact score calculator 120 in FIG. 1).

The relevancy test 514 analyzes the event rules and impact scores of an application to automatically determine whether to recommend that a client enable event rules for the application within their system. In some examples, the relevancy test 514 compares impact scores of events associated with the application to an impact score threshold and compares the degree to which existing event rules associated with the application are prevalent as active policies within other clients' systems. For instance, if the application has an impact score greater than 65 (e.g., on a scale from 0 to 100) and an event rule associated with the application is in use by more than 25% of other clients, a recommendation for that event rule to the to the client is sent in the recommendations data store 516. It should be understood that, in other examples, other thresholds may be used to determine whether a recommendation is to be sent to the recommendations data store 516. Further, in other examples, other methods of evaluating event rules associated with an application in conjunction with impact scores of the application in a client's system may be used in the relevancy test 514 without departing from the description.

The recommendations data store 516 is configured to store recommendations of event rules that are to be made to clients as described herein. Further, the recommendations data store 516 may be configured to store additional data associated with the recommendations and/or associated event rules, such as feedback data from clients based on their responses to sent recommendations. In some examples, recommendations are sent at 518 and may be viewed or dismissed at the client system receiving the recommendations at 520. If the recommendations are dismissed at 520, a dismissal indicator is updated to the recommendations data store 516 as feedback data at 522, which may be used in determining whether to send recommendations to the client and/or when to send recommendations to the client. For instance, if the dismissal received from the client indicates the client does not want additional recommendations for the next two weeks, that information is stored in the recommendations data store 516 and is evaluated later when determining whether to send new recommendations to that client.

Alternatively, if the sent recommendations are not dismissed at 520, the sent recommendations are displayed to a user on the client system at 524, enabling the user to evaluate the recommended event rules. The displayed recommendations may include descriptions of the event rules that are being recommended and/or information describing why the recommendation is being made, such as impact scores of the events associated with the recommended event rules and/or information indicating how often the recommended event rules are used by other clients and/or information indicating how satisfied other clients are with the recommended event rules.

At 526, if one or more of the recommended event rules are accepted, the policies associated with the client system are updated to include the accepted event rules at 528. Alternatively, when recommended event rules are not accepted at 526, that choice is provided back to the recommendations data store 516 as feedback. For instance, if a user on a client system rejects an event rule at 526, that selection may be used as feedback data in the recommendations data store 516 to cause the system to refrain from recommending the rejected event rule in the future, or to refrain from recommending it for at least a defined length of time. In other examples, feedback from users' choices in response to recommended event rules may be used to adjust operations of the recommendation system in other ways without departing from the description.

Figure 6:
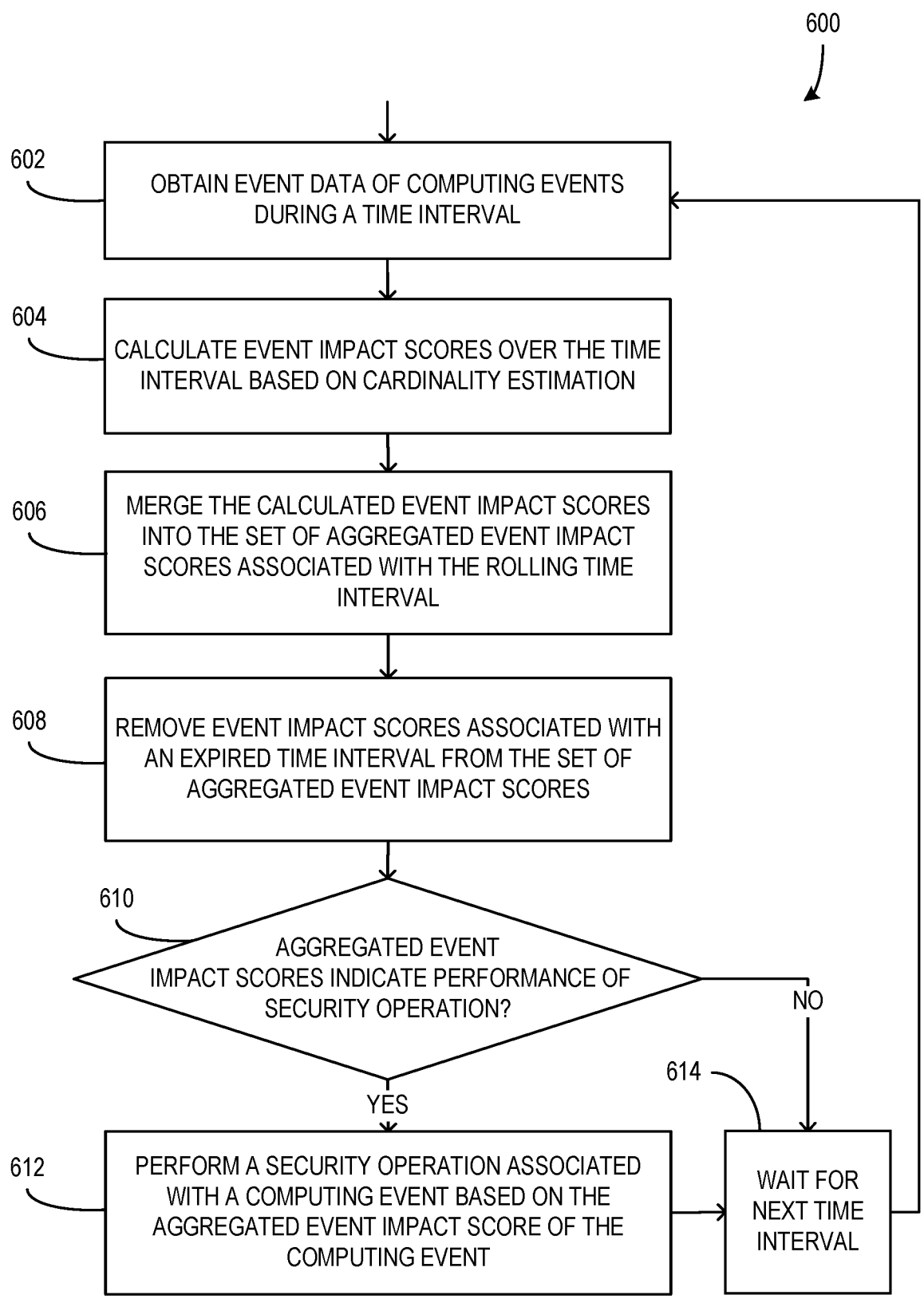
FIG. 6 is a flowchart illustrating a process of automatically performing security operations associated with a client system based on aggregated event impact scores of computing events during a rolling time interval according to an embodiment.

FIG. 6 is a flowchart illustrating a process 600 of automatically performing security operations associated with a client system (e.g., clients 104) based on aggregated event impact scores (e.g., aggregated event impact scores 130) of computing events (e.g., computing events 109) during a rolling time interval (e.g., rolling interval 132) according to an embodiment. In some examples, the process 600 is executed or otherwise performed by a security platform such as security platform 102 of FIG. 1. At 602, event data of computing events is obtained during a time interval. In some examples, the obtained event data is associated with events that occurred during a most recent complete time interval (e.g., event data may be obtained in the morning for all events that occurred during the previous day, which is the most recent complete day). Further, the obtained event data is associated with devices in a client system. In some examples, the security platform 102 performs the process 600 using event data from multiple client systems separately (e.g., a process 600 is performed for event data of a first client system and a separate process 600 is performed for event data of a second client system). Obtaining the event data may include sending a request to a client system for event data and receiving a response and/or receiving event data from the client system based on an established schedule (e.g., the client system is configured to send event data from the previous day on every day at a scheduled time).

At 604, event impact scores over the time interval of the obtained event data are calculated for the computing events of the obtained event data. The calculation of the event impact scores is based on at least cardinality estimation (e.g., using a HyperLogLog algorithm to estimate a quantity of unique devices in the client system with which an event is associated). The event impact scores may be calculated to be specific to particular events and/or particular software applications with which computing events are associated (e.g., an application is associated with more than one event and an event impact score for the application is calculated based on all the events with which the application is associated). Additionally, or alternatively, the calculation of the event impact scores may be based on other impact measures as well, such as a count of alerts associated with an event or application. In some examples where multiple measures or data points are used to calculate event impact scores, the multiple data points are adjusted with weight factor values and combined as weighted values to form an event impact score (e.g., applying a first weight factor value to a probabilistic cardinality estimate, applying a second weight factor value to a counted alert quantity, and combining the weighted cardinality estimate and the weighted alert quantity to form the event impact score of the computing event). Other types of data may be used in the calculation of event impact scores without departing from the description.

At 606, the calculated event impact scores are merged into the set of aggregated event impact scores associated with the rolling time interval. In some examples, the rolling time interval is defined length, such as 30 days, and the length of the time interval with which the obtained event data is associated is a subinterval of the rolling time interval, such as a one day. The aggregated event impact scores may be merged or otherwise updated with the calculated event impact scores by applying a weight factor to the calculated scores (e.g., each daily event impact score is associated with $\frac{1}{30}^{th}$ the time interval of the associated aggregated event impact score, so the daily event impact score is divided by 30 as a weight factor) and averaging them or otherwise combining them with the associated aggregated scores. If the calculated event impact scores include a score for a computing event and an aggregated event impact score for the computing event is not present in the set of aggregated event impact scores, the calculated event impact score for the computing event is added to the set of aggregated event impact scores. Alternatively, or additionally, if scores for a computing event are present in both the calculated event impact scores and the aggregated event impact scores, the aggregated event impact score of the computing event is updated or merged with the calculated event impact score of the computing event as described herein. Other methods of merging the calculated event impact scores into the aggregated event impact scores may be used without departing from the description herein.

At 608, event impact scores associated with an expired time interval are removed from the set of aggregated event impact scores. In some examples, where the rolling time interval is 30 days and the time interval of the obtained event data is one day, the expired time interval is the earliest day represented in the rolling time interval (e.g., the rolling time interval is August $1^{st}$ through August $30^{th}$, the new time interval is August $31^{st}$, so the expired time interval is now August $1^{st}$). Removing the expired event impact scores (the event impact scores associated with the expired time interval) may include determining the event impact scores of the events associated with event data from the expired time interval and adjusting the aggregated event impact scores by unmerging those expired event impact scores (e.g., as with the merging process described above, the expired event impact score is divided by 30 as a weight factor and the result is subtracted from the associated aggregated impact score). As a result of removing the expired event impact scores, rolling time interval of the set of aggregated event impact scores has been shifted by one subinterval (e.g., one day from an interval of August $1^{st}$-August $30^{th}$ to an interval of August $2^{nd}$-August $31^{st}$).

At 610, if the aggregated event impact scores indicate that one or more security operations are to be performed, the process proceeds to 612. Alternatively, if the aggregated event impact scores do not indicate that one or more security operations are to be performed, the process proceeds to 614. In some examples, the determination of whether to perform a security operation for a particular event or associated application includes comparing the aggregated event impact score to a defined event impact threshold. If the aggregated event impact score exceeds the event impact threshold, the performance of a security operation is triggered. Alternatively, if the aggregated event impact score does not exceed the event impact threshold, the performance of a security operation is not triggered. Additionally, or alternatively, other methods of evaluating aggregated event impact scores may be used without departing from the description (e.g., security operations are triggered for all aggregated event impact scores in a defined score range (the top 10% of aggregated event impact scores)).

At 612, a security operation associated with a computing event is performed based on the aggregated event impact score of the computing event. In some examples, a plurality of security operations are triggered for a single computing event and/or a plurality of computing events. Additionally, or alternatively, the triggered security operations may be associated with a software application (e.g., an application with which multiple computing events are associated). In some examples, the security operations include identifying event rules associated with the computing events that may be in use in other client systems and sending recommendations of those identified event rules to the client system with which the obtained event data is associated. The sent recommendations enable a user at the client system to approve the recommendations, causing the approved event rules to be enabled or activated for the client system, or to reject the recommendations such that the rejected event rules are not enabled for the client system. Additionally, or alternatively, security operations may include automatically enabling or activating identified event rules on the client system based on client system preapproval of automatic event rule activation. Other security operations may be triggered at 612 without departing from the description herein.

At 614, the security platform waits for the next time interval and then returns to 602. In some examples, the time interval is one day, so the security platform waits for one day to pass at 614. As a result, the process 600 loops and may be performed once per time interval until the process is deactivated or otherwise stopped.

Figure 7:
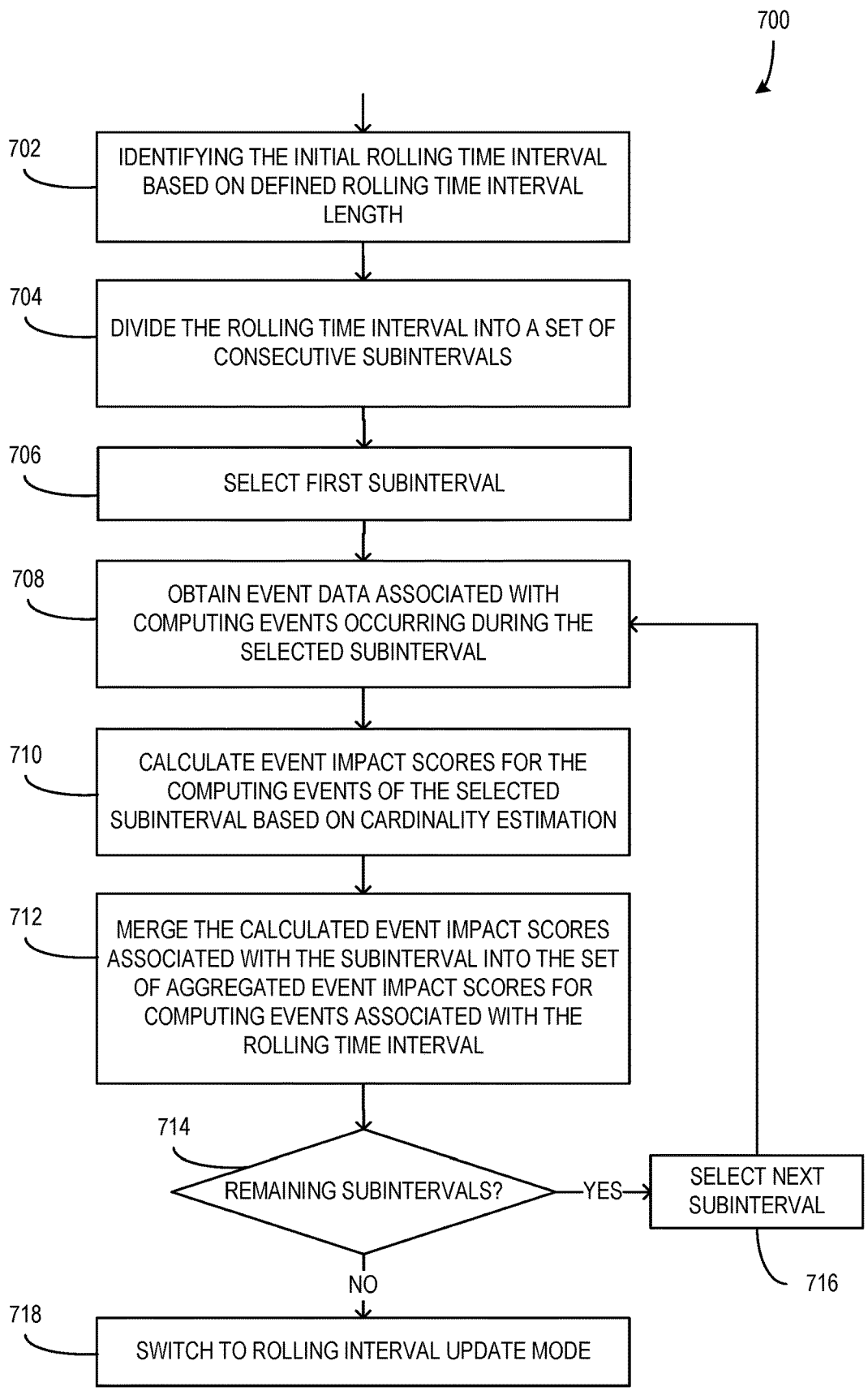
FIG. 7 is a flowchart illustrating a process of initializing a set of aggregated event impact scores of computing events over a rolling time interval according to an embodiment.

FIG. 7 is a flowchart illustrating a process 700 of initializing a set of aggregated event impact scores (e.g., aggregated impact scores 130) of computing events (e.g., computing events 109) over a rolling time interval (e.g., rolling interval 132) according to an embodiment. In some examples, the process 700 is executed or otherwise performed by a security platform, such as security platform 102 of FIG. 1. Further, the process 700 may be performed prior to process 600 to initialize, or bootstrap, the set of aggregated event impact scores that is used in the process 600 as described herein. At 702, the initial rolling time interval is identified based on a defined rolling time interval length. In some examples, the defined rolling time interval length is 30 days. In such examples, identifying the initial rolling time interval may include identifying a most recent, complete subinterval (e.g., the most recent complete day) and then identifying an interval of a rolling time interval length with an endpoint of the identified most recent complete subinterval (e.g., identifying a 30-day interval that ends at the most recent complete day).

At 704, the identified rolling time interval is divided into a set of consecutive subintervals. For instance, a 30-day rolling time interval is divided into a set of 30 consecutive one-day subintervals with the last subinterval being the most recent complete day referenced above. At 706, a first subinterval of the set of consecutive subintervals is selected (e.g., the earliest day in the 30-day rolling time interval). In some examples, the subintervals are selected chronologically, but in other examples, other orders may be used (e.g., reverse chronological or based on other aspects of the process, such as which sets of event data can be accessed and/or processed most efficiently).

At 708, event data associated with computing events that occurred during the selected subinterval are obtained. The event data may be obtained in substantially the same manner as described above with respect to 602 of FIG. 6 and/or other descriptions herein. At 710, event impact scores for the computing events of the selected subinterval are calculated based on cardinality estimation. In some examples, the event impact scores are calculated using substantially the same process as described above with respect to 604 of FIG. 6, the impact score calculator 120 and impact scores 128 of FIG. 1, and/or other descriptions herein.

At 712, the calculated event impact scores associated with the selected subinterval are merged into the set of aggregated event impact scores for computing events associated with the rolling time interval. In some examples, the event impact scores are merged with the aggregated event impact scores using substantially the same process as described above with respect to 606 of FIG. 6, the impact score aggregator 126 and aggregated impact scores 130 of FIG. 1, and/or other descriptions herein. Further, when the selected subinterval is the first subinterval to be selected, the calculated event impact scores of the subinterval may be added or assigned as the set of aggregated event impact scores for the rolling time interval, as the set of aggregated event impact scores may not exist or may be empty prior to the initialization process 700.

At 714, if subintervals of the rolling time interval remain to be processed, the process proceeds to 716, at which point the next subinterval of the rolling time interval is selected and the process returns to 708. Alternatively, if no subintervals of the rolling time interval remain to be processed, the process proceeds to 718. At 718, the security platform switches to a rolling interval update mode. The rolling interval update mode (e.g., the daily run stage or mode as described above with respect to FIG. 3) may include the security platform performing process 600 of FIG. 6 as described above.

Exemplary Operating Environment

Aspects of the disclosure provide a security system that identifies events in a computing system that may be threats and that are impactful in the computing system and automatically performs an associated security operation such as recommendation of, and/or enforcement of, a related rule in an efficient manner.

Figure 8:
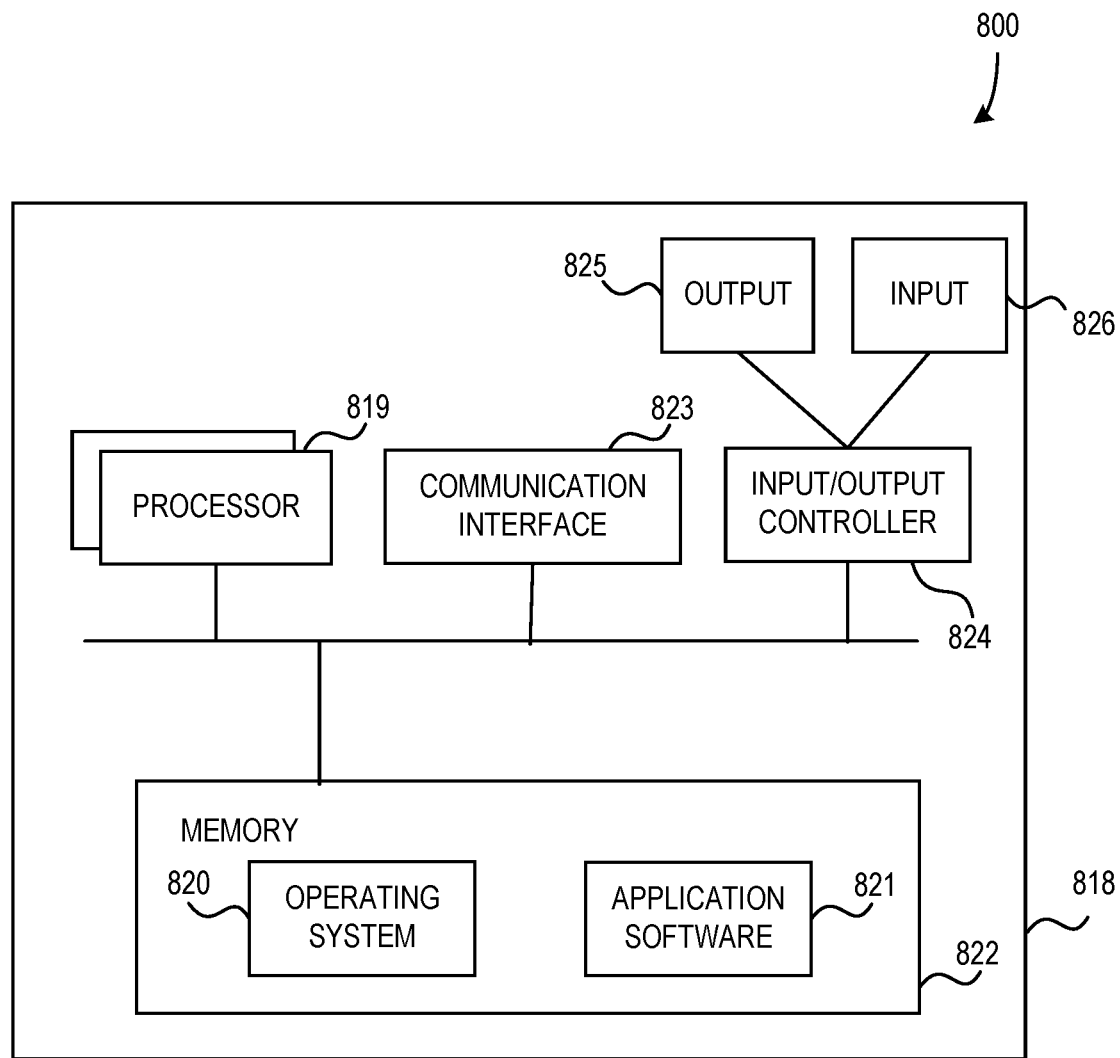
FIG. 8 illustrates a computing apparatus according to an embodiment as a functional block diagram.

The present disclosure is operable with a computing apparatus according to an embodiment as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hard-coded machine. Platform software comprising an operating system 820 or any other suitable platform software may be provided on the apparatus 818 to enable application software 821 to be executed on the device. According to an embodiment, calculating event impact scores and based on the calculated event impact scores, automatically performing security operations as described herein may be accomplished by software, hardware, and/or firmware.

Computer executable instructions may be provided using any computer-readable media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, random access memory (RAM), read only memory (ROM), erasable programmable read only memory (EPROM), electrically erasable programmable read only memory (EEPROM), persistent memory, phase change memory, flash memory or other memory technology, compact disc read only memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g., using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g., a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network personal computers (PCs), minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system for automatically performing security operations associated with a client system based on aggregated event impact scores of computing events during a rolling time interval comprises: a processor; and a non-transitory computer readable medium having stored thereon program code for transferring data to another computer system, the program code causing the processor to: obtain event data from a plurality of computing devices of the client system associated with computing events occurring during a time interval after an endpoint of the rolling time interval; calculate event impact scores for the computing events of the obtained event data over the time interval based at least on cardinality estimation; merge the calculated event impact scores into a set of aggregated event impact scores for computing events associated with the rolling time interval; remove event impact scores of computing events associated with an expired time interval from the set of aggregated event impact scores; and perform at least one security operation for at least one computing event based on the set of aggregated event impact scores.

An example method of automatically performing security operations associated with a client system based on aggregated event impact scores of computing events during a rolling time interval comprises: obtaining, by a processor, event data from a plurality of computing devices of the client system associated with computing events occurring during a time interval after an endpoint of the rolling time interval; calculating, by the processor, event impact scores for the computing events of the obtained event data over the time interval based at least on cardinality estimation; merging, by the processor, the calculated event impact scores into a set of aggregated event impact scores for computing events associated with the rolling time interval; removing, by the processor, event impact scores of computing events associated with an expired time interval from the set of aggregated event impact scores; and performing, by the processor, at least one security operation for at least one computing event based on the set of aggregated event impact scores.

An example non-transitory computer storage medium having stored thereon program code executable by a first computer system at a first site, the program code embodying a method that comprises: obtaining event data from a plurality of computing devices of a client system associated with computing events occurring during a time interval after an endpoint of a rolling time interval; calculating event impact scores for the computing events of the obtained event data over the time interval based at least on cardinality estimation; merging the calculated event impact scores into a set of aggregated event impact scores for computing events associated with the rolling time interval; removing event impact scores of computing events associated with an expired time interval from the set of aggregated event impact scores; and performing at least one security operation for at least one computing event based on the set of aggregated event impact scores.

Alternatively, or in addition to the other examples described herein, examples include any combination of the following:

further comprising initializing, by the processor, the set of aggregated event impact scores prior to obtaining event data associated with computing events during the time interval, the initializing including: identifying, by the processor, the rolling time interval based on a defined rolling time interval length; dividing, by the processor, the rolling time interval into a set of consecutive subintervals; and for each subinterval in the set of consecutive subintervals: obtaining, by the processor, event data associated with computing events occurring during the subinterval; calculating, by the processor, event impact scores for the computing events of the obtained event data associated with the subinterval based at least on cardinality estimation; and merging, by the processor, the calculated event impact scores associated with the subinterval into the set of aggregated event impact scores for computing events associated with the rolling time interval.

wherein calculating an event impact score for a computing event of the computing events includes: determining a probabilistic cardinality estimate of the computing event based on the event data; counting an alert quantity associated with the computing event in the event data; applying a first weight factor value to the determined probabilistic cardinality estimate to form a weighted cardinality estimate; applying a second weight factor value to the counted alert quantity to form a weighted alert quantity; and combining the weighted cardinality estimate and the weighted alert quantity to form the event impact score of the computing event.

wherein merging the calculated event impact scores into the set of aggregated event impact scores includes: based on the calculated event impact scores including an impact score for an event for which the set of aggregated event impact scores lacks an impact score, adding the event and associated impact score into the set of aggregated event impact scores; and based on the calculated event impact scores and the set of aggregated event impact scores including impact scores for the event, updating the impact score of the event in the set of aggregated event impact scores based on the impact score of the event in the calculated event impact scores.

wherein performing at least one security operation for at least one computing event based on the set of aggregated event impact scores includes: identifying an aggregated event impact score of the set of aggregated event impact scores that is associated with a computing event of the computing events and that exceeds a defined impact score threshold; obtaining an event rule configured to trigger a security operation based on detection of the computing event, wherein the obtained event rule is in use in other systems; sending a recommendation of the obtained event rule to the client system; and based on acceptance of the sent recommendation, enabling the obtained event rule on the client system.

wherein performing at least one security operation for at least one computing event based on the set of aggregated event impact scores includes: identifying an aggregated event impact score of the set of aggregated event impact scores that is associated with a computing event of the computing events and that exceeds a defined impact score threshold; obtaining an event rule configured to trigger a security operation based on detection of the computing event, wherein the obtained event rule is in use in a quantity of other systems that exceeds a defined system prevalence threshold; and based on the identified aggregated event impact score exceeding the defined impact score threshold and the obtained event rule exceeding the defined system prevalence threshold, automatically enabling the obtained event rule on the client system.

wherein calculating event impact scores based at least on cardinality estimation includes using a HyperLogLog algorithm to generate a probabilistic cardinality estimate of a quantity of unique computing devices in the client system upon which a computing event occurred during the time interval based on the event data.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for obtaining, by a processor, event data from a plurality of computing devices of the client system associated with computing events occurring during a time interval after an endpoint of the rolling time interval; exemplary means for calculating, by the processor, event impact scores for the computing events of the obtained event data over the time interval based at least on cardinality estimation; exemplary means for merging, by the processor, the calculated event impact scores into the set of aggregated event impact scores for computing events associated with the rolling time interval; exemplary means for removing, by the processor, event impact scores of computing events associated with an expired time interval from the set of aggregated event impact scores; and exemplary means for performing, by the processor, at least one security operation for at least one computing event based on the set of aggregated event impact scores.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of automatically performing security operations associated with a client system based on aggregated event impact scores of computing events during a rolling time interval, the method comprising:
    obtaining, by a processor, event data from a plurality of computing devices of the client system associated with computing events occurring during a time interval after an endpoint of the rolling time interval;
    calculating, by the processor, event impact scores for the computing events of the obtained event data over the time interval based at least on cardinality estimation;
    merging, by the processor, the calculated event impact scores into a set of aggregated event impact scores for computing events associated with the rolling time interval;
    removing, by the processor, event impact scores of computing events associated with an expired time interval from the set of aggregated event impact scores; and
    performing, by the processor, at least one security operation for at least one computing event based on the set of aggregated event impact scores.

2. The method of claim 1, the method further comprising initializing, by the processor, the set of aggregated event impact scores prior to obtaining event data associated with computing events during the time interval, the initializing including:
    identifying, by the processor, the rolling time interval based on a defined rolling time interval length;
    dividing, by the processor, the rolling time interval into a set of consecutive subintervals; and
    for each subinterval in the set of consecutive subintervals:
        obtaining, by the processor, event data associated with computing events occurring during the subinterval;
        calculating, by the processor, event impact scores for the computing events of the obtained event data associated with the subinterval based at least on cardinality estimation; and
        merging, by the processor, the calculated event impact scores associated with the subinterval into the set of aggregated event impact scores for computing events associated with the rolling time interval.

3. The method of claim 1, wherein calculating an event impact score for a computing event of the computing events includes:
    determining a probabilistic cardinality estimate of the computing event based on the event data;
    counting an alert quantity associated with the computing event in the event data;
    applying a first weight factor value to the determined probabilistic cardinality estimate to form a weighted cardinality estimate;
    applying a second weight factor value to the counted alert quantity to form a weighted alert quantity; and
    combining the weighted cardinality estimate and the weighted alert quantity to form the event impact score of the computing event.

4. The method of claim 1, wherein merging the calculated event impact scores into the set of aggregated event impact scores includes:
    based on the calculated event impact scores including an impact score for an event for which the set of aggregated event impact scores lacks an impact score, adding the event and associated impact score into the set of aggregated event impact scores; and
    based on the calculated event impact scores and the set of aggregated event impact scores including impact scores for the event, updating the impact score of the event in the set of aggregated event impact scores based on the impact score of the event in the calculated event impact scores.

5. The method of claim 1, wherein performing at least one security operation for at least one computing event based on the set of aggregated event impact scores includes:
    identifying an aggregated event impact score of the set of aggregated event impact scores that is associated with a computing event of the computing events and that exceeds a defined impact score threshold;
    obtaining an event rule configured to trigger a security operation based on detection of the computing event, wherein the obtained event rule is in use in other systems;
    sending a recommendation of the obtained event rule to the client system; and
    based on acceptance of the sent recommendation, enabling the obtained event rule on the client system.

6. The method of claim 1, wherein performing at least one security operation for at least one computing event based on the set of aggregated event impact scores includes:
    identifying an aggregated event impact score of the set of aggregated event impact scores that is associated with a computing event of the computing events and that exceeds a defined impact score threshold;
    obtaining an event rule configured to trigger a security operation based on detection of the computing event, wherein the obtained event rule is in use in a quantity of other systems that exceeds a defined system prevalence threshold; and
    based on the identified aggregated event impact score exceeding the defined impact score threshold and the obtained event rule exceeding the defined system prevalence threshold, automatically enabling the obtained event rule on the client system.

7. The method of claim 1, wherein calculating event impact scores based at least on cardinality estimation includes using a HyperLogLog algorithm to generate a probabilistic cardinality estimate of a quantity of unique computing devices in the client system upon which a computing event occurred during the time interval based on the event data.

8. A computer system for automatically performing security operations associated with a client system based on aggregated event impact scores of computing events during a rolling time interval, the computer system comprising:
  a processor; and
  a non-transitory computer readable medium having stored thereon program code for transferring data to another computer system, the program code causing the processor to:
  obtain event data from a plurality of computing devices of the client system associated with computing events occurring during a time interval after an endpoint of the rolling time interval;
  calculate event impact scores for the computing events of the obtained event data over the time interval based at least on cardinality estimation;
  merge the calculated event impact scores into a set of aggregated event impact scores for computing events associated with the rolling time interval;
  remove event impact scores of computing events associated with an expired time interval from the set of aggregated event impact scores; and
  perform at least one security operation for at least one computing event based on the set of aggregated event impact scores.

9. The computer system of claim 8, wherein the program code further causes the processor to initialize the set of aggregated event impact scores prior to obtaining event data associated with computing events during the time interval, wherein initializing the set of aggregated event impact scores includes:
  identifying the rolling time interval based on a defined rolling time interval length;
  dividing the rolling time interval into a set of consecutive subintervals; and
  for each subinterval in the set of consecutive subintervals:
    obtaining event data associated with computing events occurring during the subinterval;
    calculating event impact scores for the computing events of the obtained event data associated with the subinterval based at least on cardinality estimation; and
    merging the calculated event impact scores associated with the subinterval into the set of aggregated event impact scores for computing events associated with the rolling time interval.

10. The computer system of claim 8, wherein calculating an event impact score for a computing event of the computing events includes:
  determining a probabilistic cardinality estimate of the computing event based on the event data;
  counting an alert quantity associated with the computing event in the event data;
  applying a first weight factor value to the determined probabilistic cardinality estimate to form a weighted cardinality estimate;
  applying a second weight factor value to the counted alert quantity to form a weighted alert quantity; and
  combining the weighted cardinality estimate and the weighted alert quantity to form the event impact score of the computing event.

11. The computer system of claim 8, wherein merging the calculated event impact scores into the set of aggregated event impact scores includes:
  based on the calculated event impact scores including an impact score for an event for which the set of aggregated event impact scores lacks an impact score, adding the event and associated impact score into the set of aggregated event impact scores; and
  based on the calculated event impact scores and the set of aggregated event impact scores including impact scores for the event, updating the impact score of the event in the set of aggregated event impact scores based on the impact score of the event in the calculated event impact scores.

12. The computer system of claim 8, wherein performing at least one security operation for at least one computing event based on the set of aggregated event impact scores includes:
  identifying an aggregated event impact score of the set of aggregated event impact scores that is associated with a computing event of the computing events and that exceeds a defined impact score threshold;
  obtaining an event rule configured to trigger a security operation based on detection of the computing event, wherein the obtained event rule is in use in other systems;
  sending a recommendation of the obtained event rule to the client system; and
  based on acceptance of the sent recommendation, enabling the obtained event rule on the client system.

13. The computer system of claim 8, wherein performing at least one security operation for at least one computing event based on the set of aggregated event impact scores includes:
  identifying an aggregated event impact score of the set of aggregated event impact scores that is associated with a computing event of the computing events and that exceeds a defined impact score threshold;
  obtaining an event rule configured to trigger a security operation based on detection of the computing event, wherein the obtained event rule is in use in a quantity of other systems that exceeds a defined system prevalence threshold; and
  based on the identified aggregated event impact score exceeding the defined impact score threshold and the obtained event rule exceeding the defined system prevalence threshold, automatically enabling the obtained event rule on the client system.

14. The computer system of claim 8, wherein calculating event impact scores based at least on cardinality estimation includes using a HyperLogLog algorithm to generate a probabilistic cardinality estimate of a quantity of unique computing devices in the client system upon which a computing event occurred during the time interval based on the event data.

15. A non-transitory computer storage medium having stored thereon program code executable by a first computer system at a first site, the program code embodying a method comprising:
  obtaining event data from a plurality of computing devices of a client system associated with computing events occurring during a time interval after an endpoint of a rolling time interval;
  calculating event impact scores for the computing events of the obtained event data over the time interval based at least on cardinality estimation;
  merging the calculated event impact scores into a set of aggregated event impact scores for computing events associated with the rolling time interval;
  removing event impact scores of computing events associated with an expired time interval from the set of aggregated event impact scores; and
  performing at least one security operation for at least one computing event based on the set of aggregated event impact scores.

16. The non-transitory computer storage medium of claim 15, wherein the method embodied by the program code further comprises initializing the set of aggregated event impact scores prior to obtaining event data associated with computing events during the time interval, the initializing including:
- Identifying the rolling time interval based on a defined rolling time interval length;
- dividing the rolling time interval into a set of consecutive subintervals; and
- for each subinterval in the set of consecutive subintervals:
  - obtaining event data associated with computing events occurring during the subinterval;
  - calculating event impact scores for the computing events of the obtained event data associated with the subinterval based at least on cardinality estimation; and
  - merging the calculated event impact scores associated with the subinterval into the set of aggregated event impact scores for computing events associated with the rolling time interval.

17. The non-transitory computer storage medium of claim 15, wherein calculating an event impact score for a computing event of the computing events includes:
- determining a probabilistic cardinality estimate of the computing event based on the event data;
- counting an alert quantity associated with the computing event in the event data;
- applying a first weight factor value to the determined probabilistic cardinality estimate to form a weighted cardinality estimate;
- applying a second weight factor value to the counted alert quantity to form a weighted alert quantity; and
- combining the weighted cardinality estimate and the weighted alert quantity to form the event impact score of the computing event.

18. The non-transitory computer storage medium of claim 15, wherein merging the calculated event impact scores into the set of aggregated event impact scores includes:
- based on the calculated event impact scores including an impact score for an event for which the set of aggregated event impact scores lacks an impact score, adding the event and associated impact score into the set of aggregated event impact scores; and
- based on the calculated event impact scores and the set of aggregated event impact scores including impact scores for the event, updating the impact score of the event in the set of aggregated event impact scores based on the impact score of the event in the calculated event impact scores.

19. The non-transitory computer storage medium of claim 15, wherein performing at least one security operation for at least one computing event based on the set of aggregated event impact scores includes:
- identifying an aggregated event impact score of the set of aggregated event impact scores that is associated with a computing event of the computing events and that exceeds a defined impact score threshold;
- obtaining an event rule configured to trigger a security operation based on detection of the computing event, wherein the obtained event rule is in use in other systems;
- sending a recommendation of the obtained event rule to the client system; and
- based on acceptance of the sent recommendation, enabling the obtained event rule on the client system.

20. The non-transitory computer storage medium of claim 15, wherein performing at least one security operation for at least one computing event based on the set of aggregated event impact scores includes:
- identifying an aggregated event impact score of the set of aggregated event impact scores that is associated with a computing event of the computing events and that exceeds a defined impact score threshold;
- obtaining an event rule configured to trigger a security operation based on detection of the computing event, wherein the obtained event rule is in use in a quantity of other systems that exceeds a defined system prevalence threshold; and
- based on the identified aggregated event impact score exceeding the defined impact score threshold and the obtained event rule exceeding the defined system prevalence threshold, automatically enabling the obtained event rule on the client system.

\* \* \* \* \*